(12) United States Patent
Taylor

(10) Patent No.: US 10,714,059 B2
(45) Date of Patent: Jul. 14, 2020

(54) METHOD FOR MANUFACTURING PICKCATCHER SYSTEM

(71) Applicant: Mackenzie Taylor, Tampa, FL (US)

(72) Inventor: Mackenzie Taylor, Tampa, FL (US)

(*) Notice: Subject to any disclaimer, the term of this patent is extended or adjusted under 35 U.S.C. 154(b) by 224 days.

(21) Appl. No.: 15/721,874

(22) Filed: Sep. 30, 2017

(65) Prior Publication Data

US 2018/0096672 A1 Apr. 5, 2018

Related U.S. Application Data

(60) Provisional application No. 62/403,671, filed on Oct. 3, 2016.

(51) Int. Cl.
| | | |
|---|---|---|
| *G10D 3/00* | (2020.01) | |
| *G10D 3/173* | (2020.01) | |
| *H01R 31/00* | (2006.01) | |
| *H04R 31/00* | (2006.01) | |
| *B33Y 80/00* | (2015.01) | |
| *B29L 31/00* | (2006.01) | |
| *B29C 64/118* | (2017.01) | |

(Continued)

(52) U.S. Cl.
CPC ............ *G10D 3/00* (2013.01); *H04R 31/00* (2013.01); *H04R 31/006* (2013.01); *B29C 64/118* (2017.08); *B29L 2031/758* (2013.01); *B33Y 10/00* (2014.12); *B33Y 80/00* (2014.12); *G10D 3/173* (2020.02); *H04N 5/2257* (2013.01); *H04R 7/04* (2013.01); *H04R 7/16* (2013.01); *H04R 7/18* (2013.01); *Y10T 29/49005* (2015.01)

(58) Field of Classification Search
CPC ........ H04R 31/00; H04R 31/006; H04R 7/04; H04R 7/16; H04R 7/18; G10D 3/00; G10D 3/163; G10D 3/173; B33Y 80/00; B33Y 10/00; B29C 64/118; B29L 2031/758; Y10T 29/49005
See application file for complete search history.

(56) References Cited

U.S. PATENT DOCUMENTS

| | | | | |
|---|---|---|---|---|
| 4,649,793 A | * | 3/1987 | Blackshear | G10D 3/00 84/453 |
| 2015/0326974 A1 | * | 11/2015 | Skubinski, III | H04R 7/04 381/309 |
| 2016/0163292 A1 | * | 6/2016 | Landis | G10D 3/00 84/453 |

FOREIGN PATENT DOCUMENTS

JP 2008209871 A * 9/2008

* cited by examiner

*Primary Examiner* — A. Dexter Tugbang
(74) *Attorney, Agent, or Firm* — Chris Tanner; FYPA PLLC

(57) ABSTRACT

A method of manufacturing a device for, among other things, preventing picks from falling into soundholes of various musical instruments is disclosed. The device is both decorative and functional, including having multiple sizes, contours, and usages. Further, various methods of manufacturing the device are disclosed. The device can have various electronics incorporated therein, and in some embodiments communicates with a mobile application on a handheld computing device. The method of manufacture can include, in an embodiment, manufacturing a circular frame having an inner and outer diameter; manufacturing a circular screen also having an inner and outer diameter to be inserted within the frame in a non-movable snug-fit, fabricating the frame to have an instrument-facing surface and a string-facing surface, and preparing an instrument-facing surface of the frame to be suitable for attachment to a surface of the instrument, among potentially other steps.

4 Claims, 27 Drawing Sheets

(51) Int. Cl.
*B33Y 10/00* (2015.01)
*H04N 5/225* (2006.01)
*H04R 7/04* (2006.01)
*H04R 7/16* (2006.01)
*H04R 7/18* (2006.01)

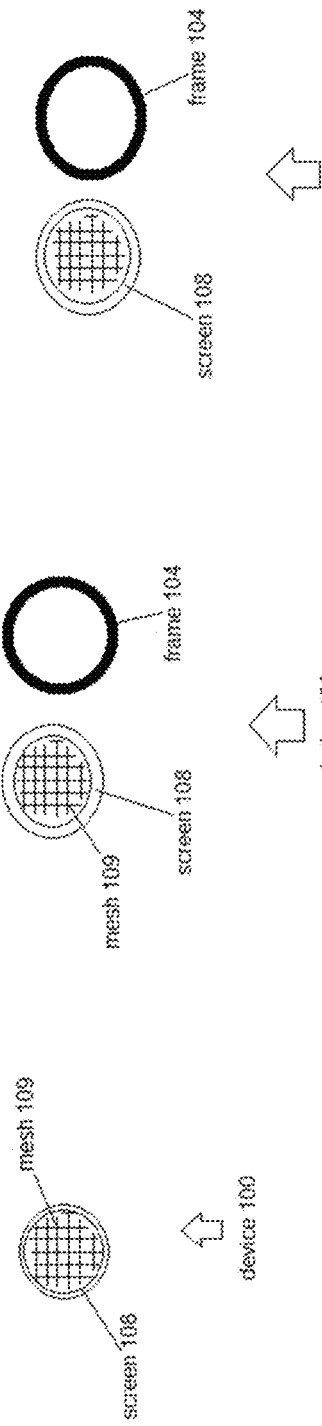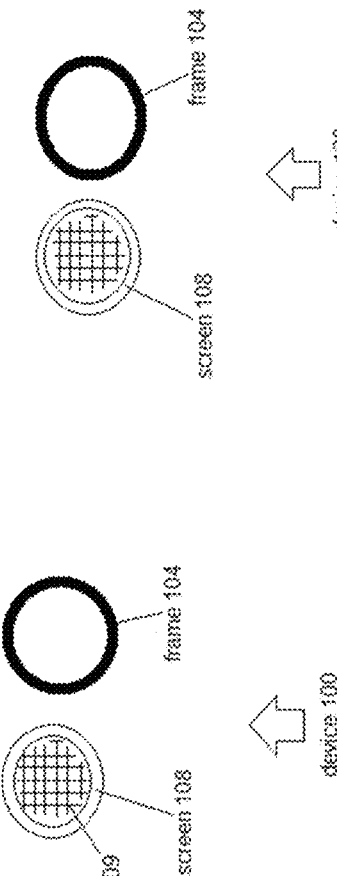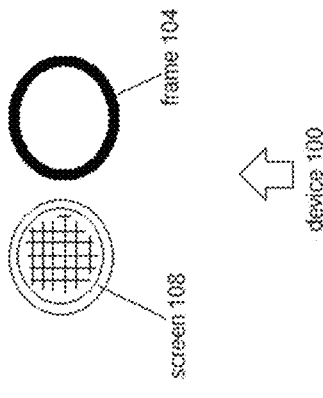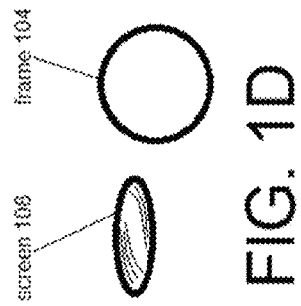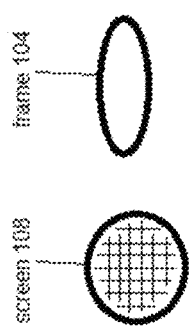

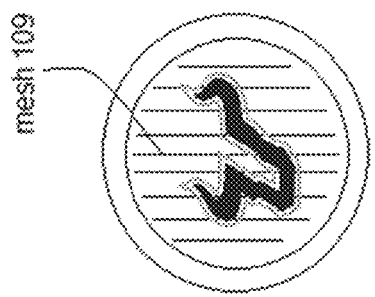
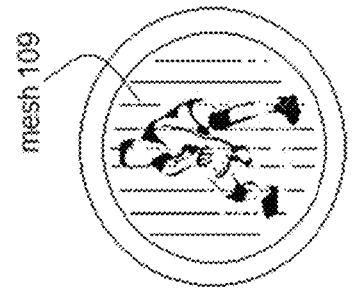
FIG. 2B
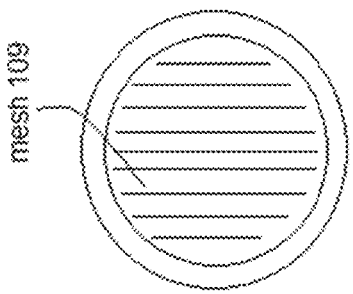
FIG. 2A

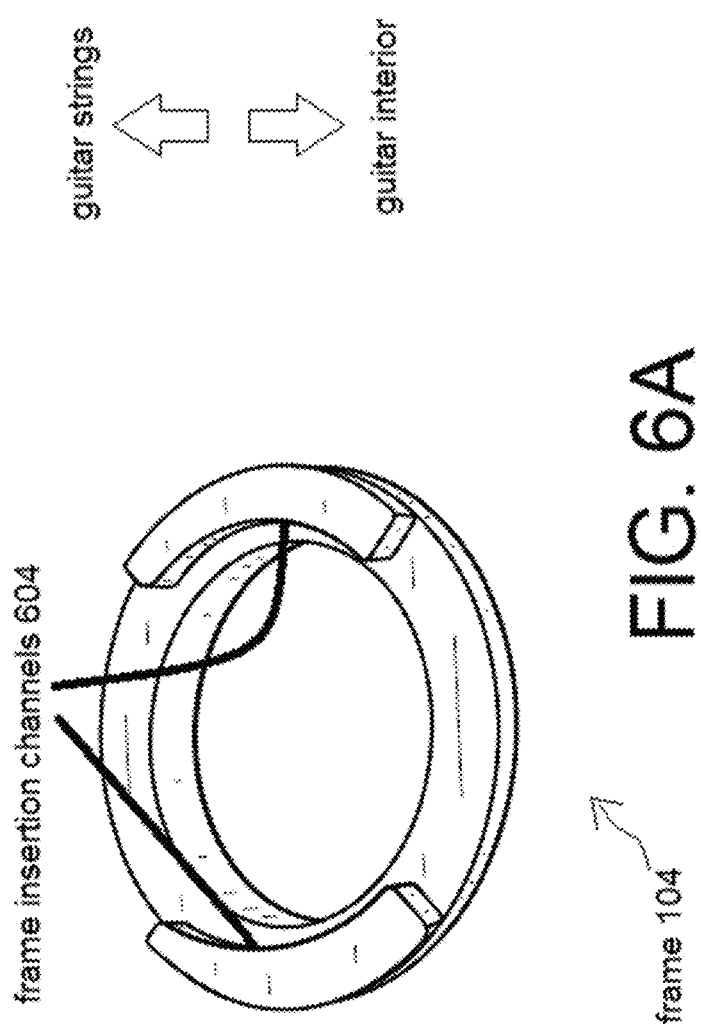

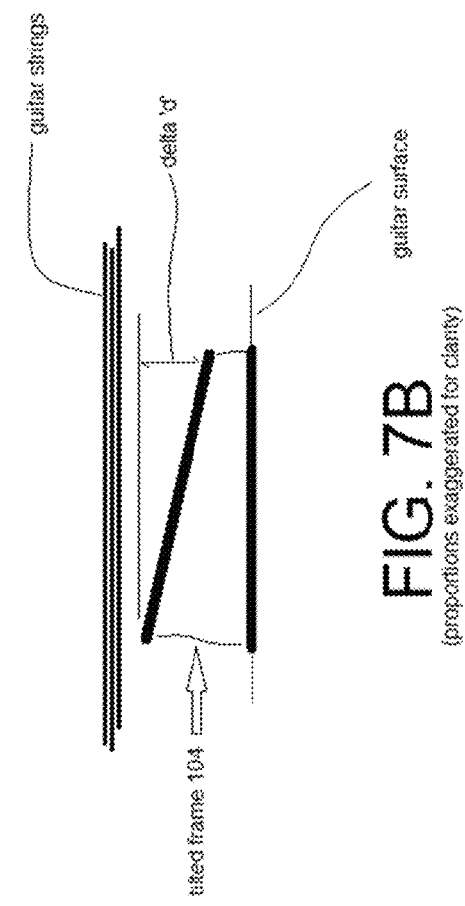
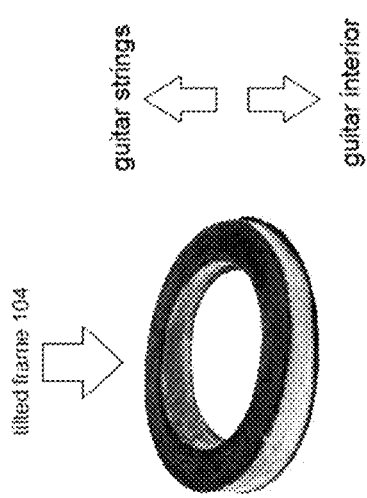

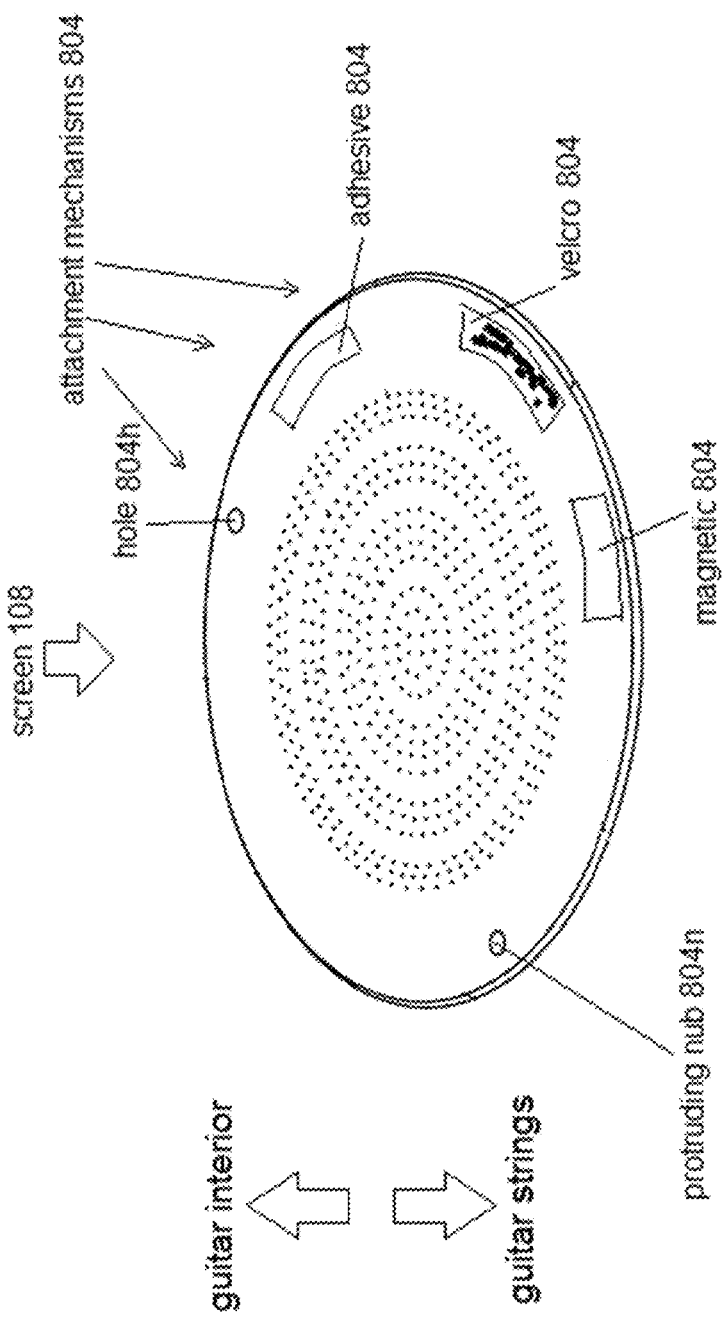

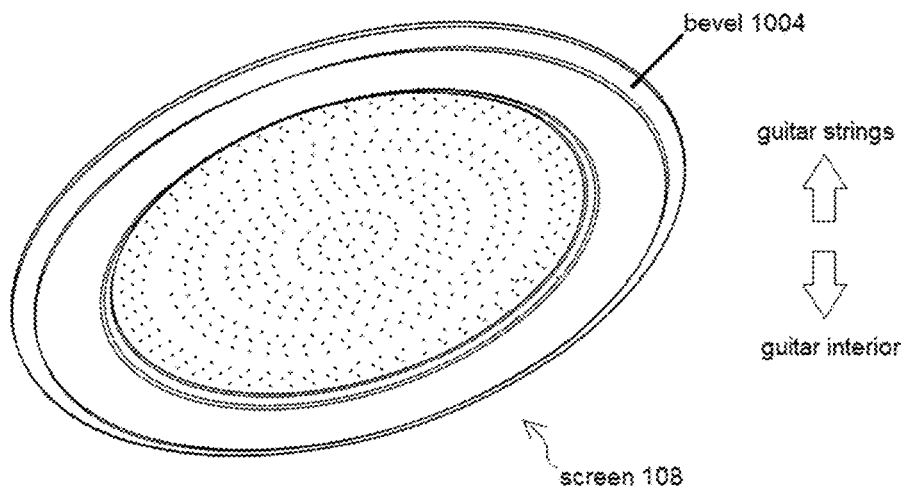
FIG. 10A (perspective view of non-flat beveled screen 108)
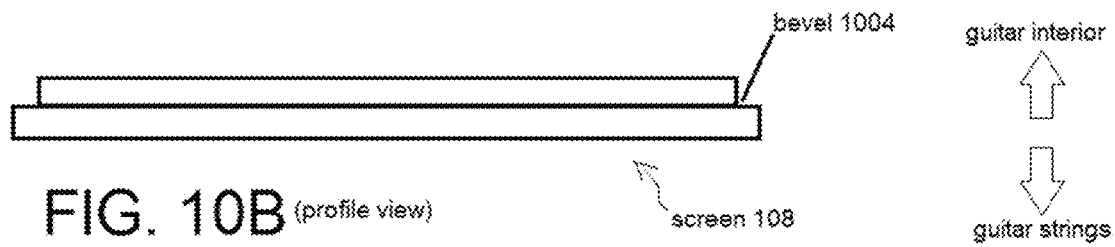
FIG. 10B (profile view)
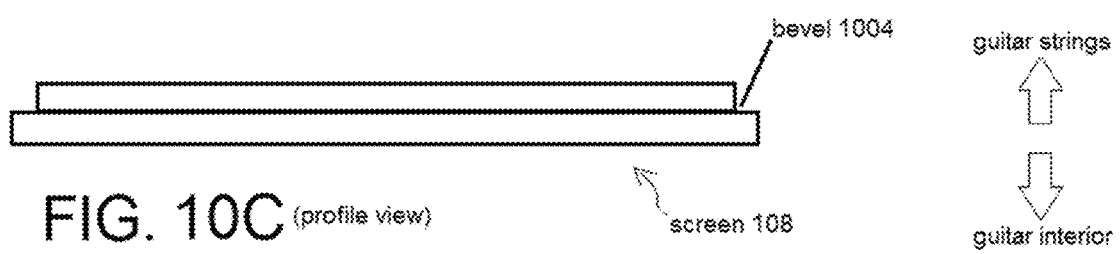
FIG. 10C (profile view)

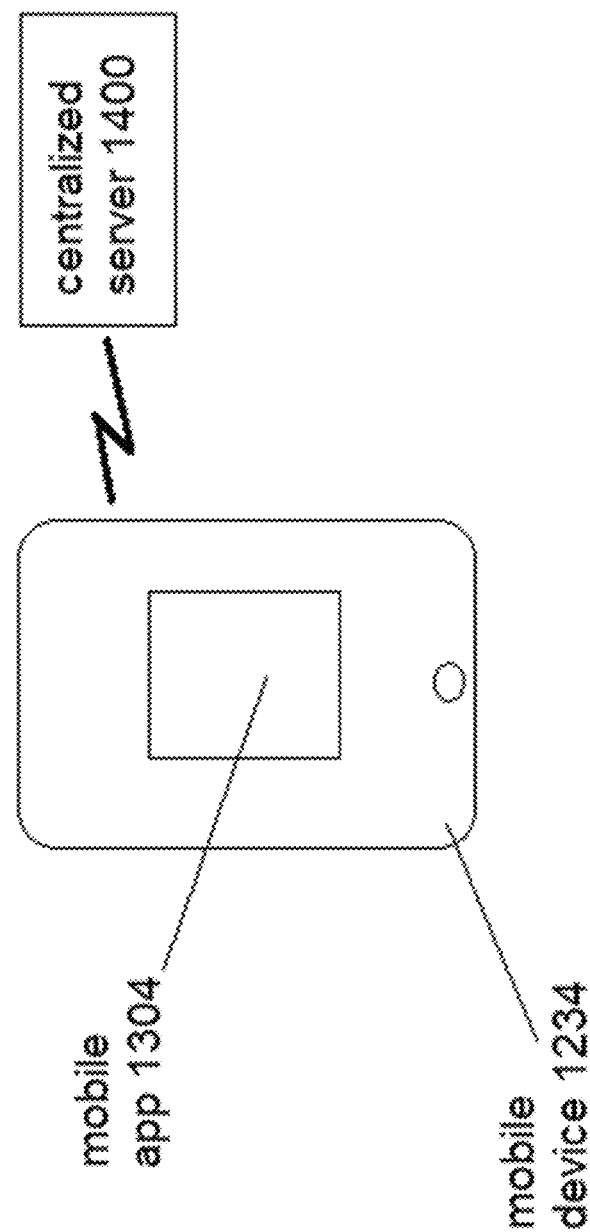

METHOD FOR MANUFACTURING PICKCATCHER SYSTEM

FIELD OF INVENTION

The subject invention relates to device for various musical instruments that have soundholes. The device is both decorative and functional.

BACKGROUND OF THE INVENTION

It is easy to lose picks in soundholes. Consequently, a convenient mechanism for covering a soundhole, yet not interfering with the sound of the instrument, is desired.

BRIEF DESCRIPTION OF THE DRAWINGS

The features, advantages and details appear, by way of example, in the following detailed description of preferred embodiments.

FIGS. 1A, 1B, 1C, 1D, 1E, 2A, and 2B show various embodiments of the inventions disclosed herein;

FIGS. 6A and 6B show frames having various bevels cut therefrom;

FIGS. 7A-7B shows a frame having a slanted upper (string-facing) surface, intentionally not parallel with its lower (interior-facing) surface;

FIG. 8 shows several details about an embodiment of the screen;

FIGS. 10A, 10B, and 10C show a screen having a multi-layer surface and a bevel located therein;

FIG. 14 shows a distributed embodiment;

DETAILED DESCRIPTION OF THE PREFERRED EMBODIMENTS

Figure 3A:
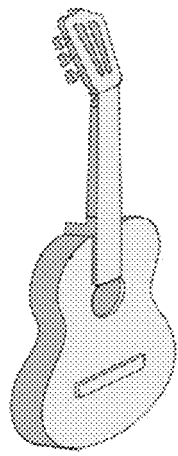
FIGS. 3A, 3B, and 3D show an embodiment of a D-frame.
Figure 3B:
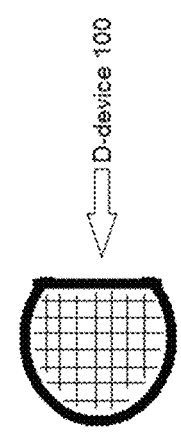
Figure 3C:
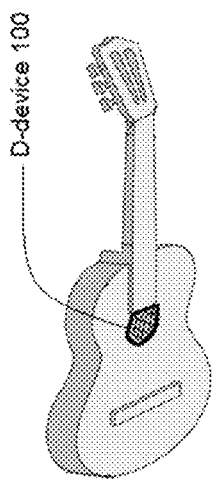
FIG. 3C shows a Prior Art guitar with no device therein.
Figure 3D:
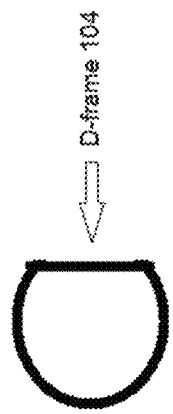

FIGS. 1A, 1B, 1C, 1D, 1E, 2A, and 2B show a pickcatcher device 100, having a frame 104 and a screen 108. The various elements in FIG. 1 can be made with 3D printing, injection molding or manufacturing, while the screen materials should be fabric, mesh, fiber, nylon, non-rigid, or other composition as described elsewhere herein, so as to prevent counter-vibration. One purpose of the device is to prevent (catch) picks, or other strumming assisting devices, from falling into the guitar body (or other musical instrument, ukulele, etc) although, as shown herein, many other purposes also exist. Some looseness or vibration-absorption may be incorporated into the frame 104 so as to prevent counter-vibration, rattling, buzzing, etc.

Various embodiments of the device 100 are intended to not affect the sound emanating from the instrument itself. Meanwhile, other embodiments are intended to do so. The device 100 is intended to be configurable and alterable enough to match a variety of user-scenarios.

Possible instruments upon which the device 100 can be employed (not an inclusive list) could include viola, violin, cello, guitar, upright bass, lute, mandolin, and ukulele. All of these instruments have soundholes, although of varying sizes. Some of these are not conventionally played with a pick, but some can be.

As such, both the diameter and thickness of the frame 104 can vary. The pickcatcher device 100 can be used for decorative patterns. This is another reason why the diameter and thickness of the frame 104 will vary.

The screen 108 is ideally nylon, not subject to finger-sweat, and in some embodiments machined to be less likely to make any counter-vibration that would interfere with sound quality. The mesh 109 within the screen 108 is also ideally nylon and not subject to finger-sweat.

One potential purpose of the mesh 109 within the screen 108 is to prevent picks from falling into the soundhole. If that were the only condition, the width of the mesh 109 could be relatively wide, e.g. 1 cm apart (both lengthwise and widthwise). However, numerous other functional and decorative purposes for the screen 108 exist, such as decorative emblems or other printings. In such embodiments, the mesh 109 can be formed closer together, in order to carry and visibly project the desired image or to prevent other small objects from entering the soundhole of the instrument.

As will be discussed in more detail herein, the frame 104 can be made from 3D printing using a variety of filaments, thereby resulting in a range of flexibilities. The more flexible, the less likely to resonate with the musical instruments and make unwanted sounds.

The tape shown in FIGS. 1A-1E is for non-limiting example purposes only, and is shown mainly to provide an easily visible example of a mechanism for adhering the screen 108 to the frame 104. In the temporary embodiment of the device 100, the adhesive for this tape does not always need to be strong, a minimal amount should be sufficient. In other instances, Velcro® could be used, in a case where, for example, installing/removing the screen 108 several times in a short period is desired.

As stated, the embodiments shown in FIGS. 1A-1E are for example purposes only. The thickness of the embodiment shown in FIG. 1A-1E might be larger than a preferred embodiment. If the frame 104 of the device 100 is too thick, it won't seat well or fit well within the instrument. This is particularly true if the frame 104 is not only too thick, but also too rigid. Most acoustic and/or wood-based musical instruments are subject to at least some warping, that is, non-planar surfaces. As such, a frame 104 that is flexible is more likely to seat well and stay in place more effectively.

There exists a personalization-aspect to the device 100 as well. Some guitar owners may prefer to personalize their instrument, but not make permanent alterations to the wood or other surfaces, to preserve the value of the instrument in case of later sale. Also because their tastes may change over time. Thus, they may wish to personalize their instrument, but not to paint or make other permanent alteration.

As shown in FIG. 2, examples of desired designs included within the embodiments herein may be a volleyball person setting, or some other symbol to make the instrument more attractive and enjoyable as an object, make it seem less like a device that requires work and effort (important for youth) e.g. a Van Halen emblem. Logos of different business organizations or educational institutions could also be used, such as USF Bulls (as shown in FIG. 2).

In a decorative embodiment, the screen 108 being finer is an advantage for making the decorations more noticeable, visible, and salient.

As shown in FIGS. 3A-3D, an embodiment of the device 100 may be non-circular, but may have a cut-off section, due to length of the fretboard. This results in a D-shaped frame 104. This is sometimes referred to as a section of the frame 104 being "sliced off". Perhaps 320 degrees, perhaps 340, perhaps 310. But not a full 360 degrees.

Figure 4:
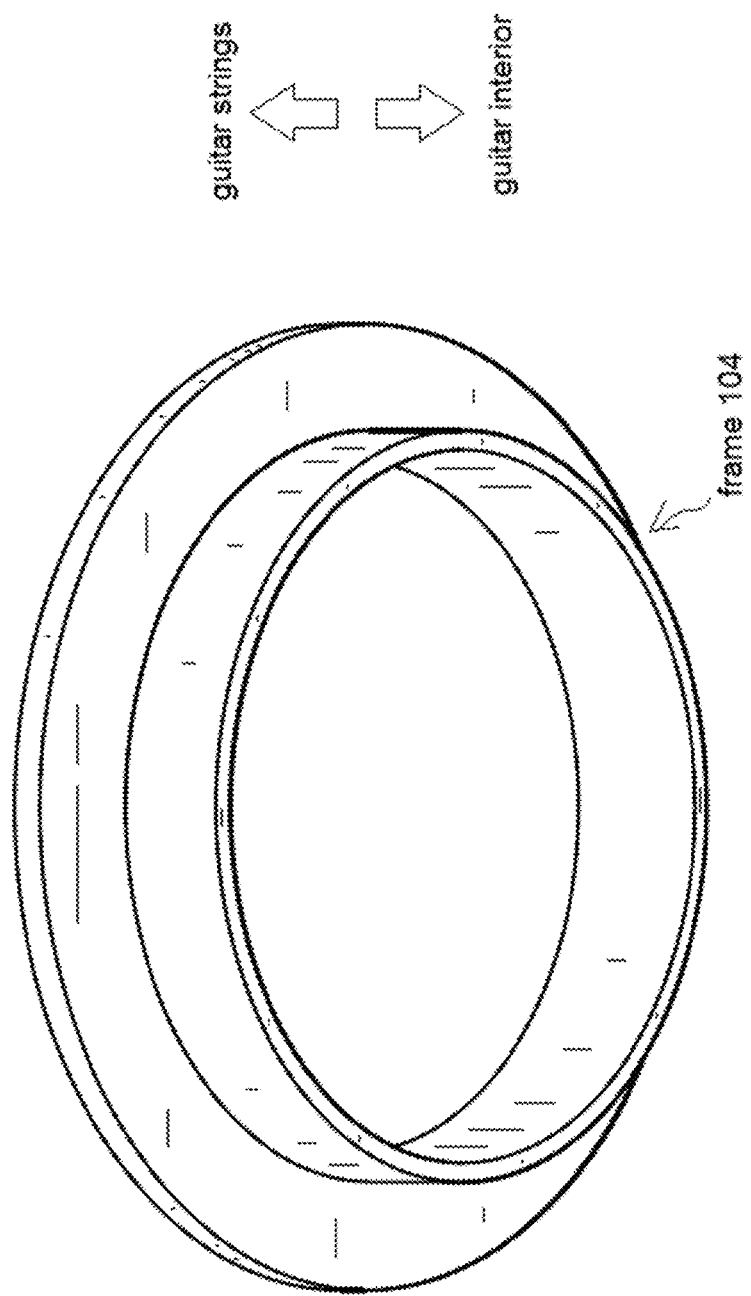
FIG. 4 shows an embodiment of a frame.

FIG. 4 shows an embodiment of a frame 104. This frame 104 is shown at the beginning because it is the least complex, having a semi-planar surface with an insertion surface 404 in the form of a protruding rim. The frame 104 from FIG. 4 fits largely flat and flush with several of the screens 108 shown herein, an example of which could be the screen 108 shown in FIG. 8.

Figure 5:
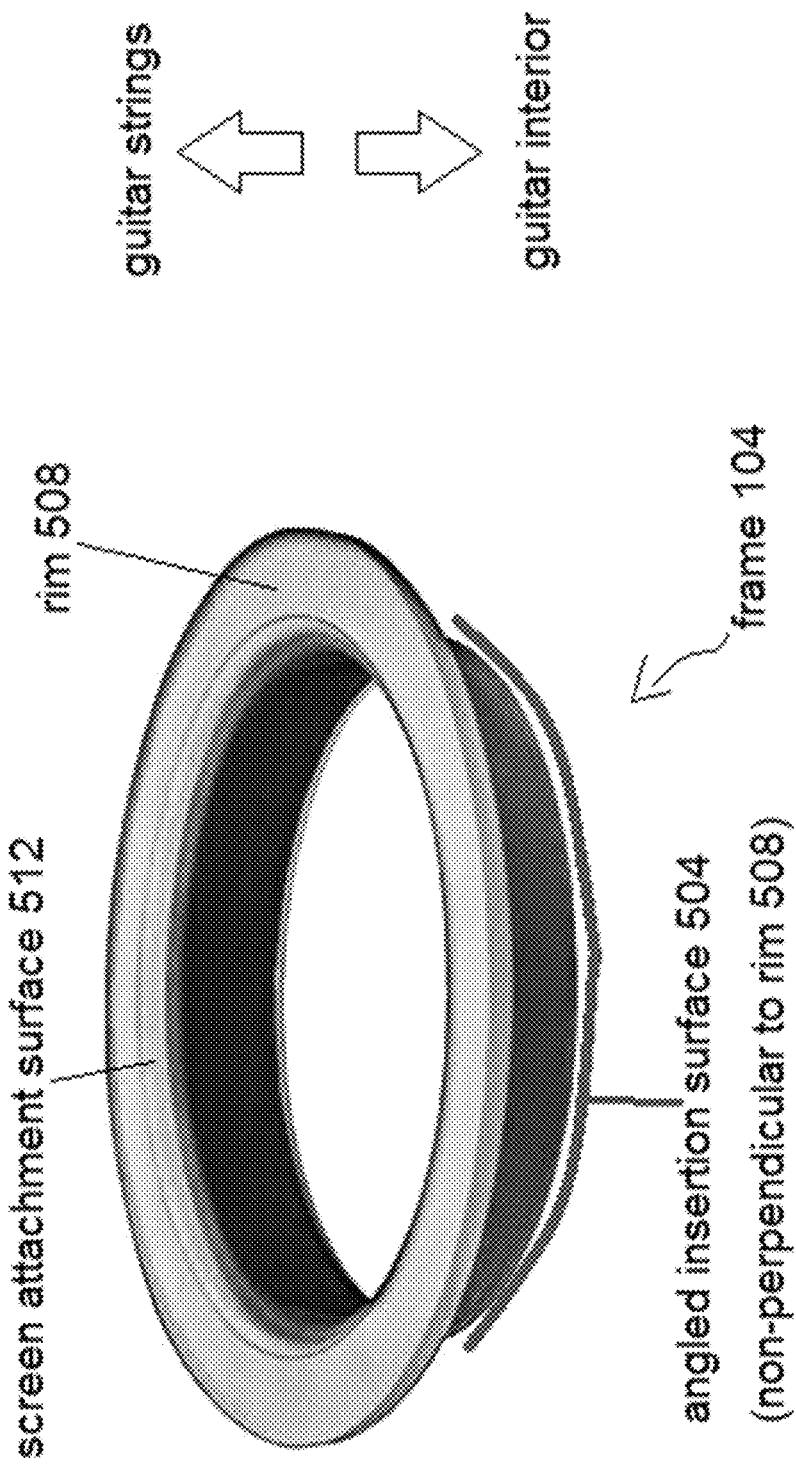
FIG. 5 shows a further embodiment of a frame.

FIG. 5 shows a further embodiment, in which the insertion surface 504 is angled rather than perpendicular as in FIG. 4. Such a modification facilitates installation of the device 100, in that a user can press and guide the device 100 until they finger-sense a sufficient amount of resistance and tightness and snug-fit.

Figure 6B:
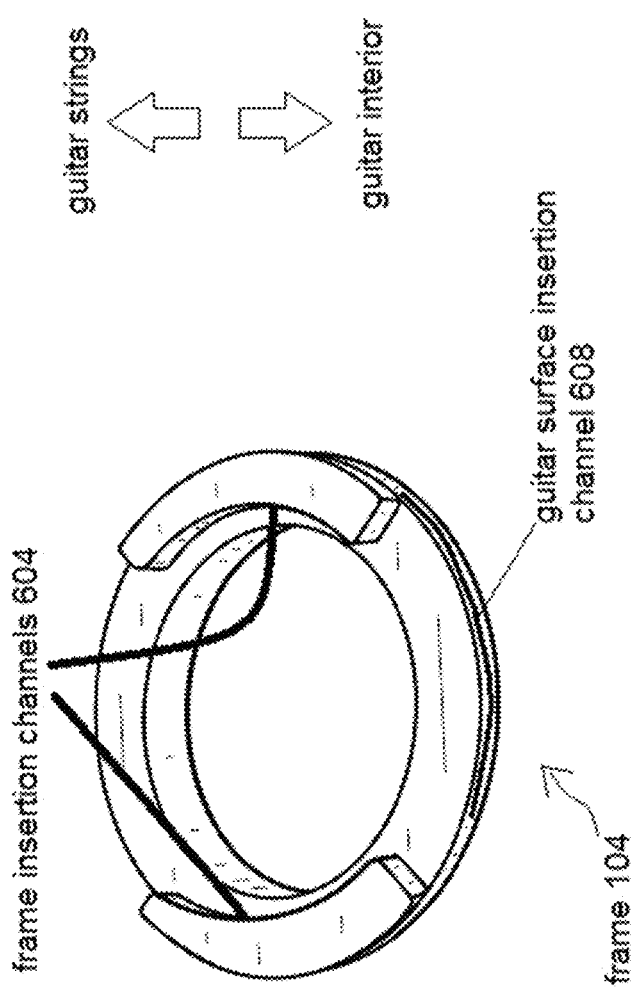

FIG. 6A shows a frame 104 with bevels cut out of an upper (string-facing) surface. The two bevels each have a screen insertion channel 604 manufactured therein. FIG. 6B shows an additional variation, in which the same frame 104 shown in FIG. 6A also has insertion channels 608 cut out of the lower (interior-facing) surface.

Figure 6C:
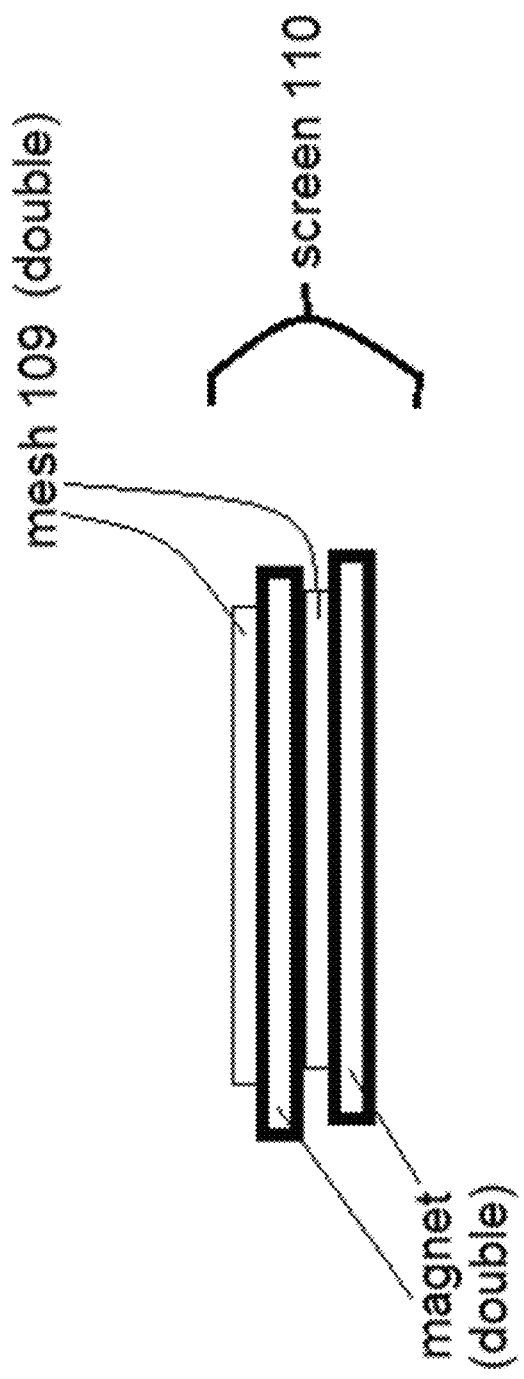
FIG. 6C shows an alternative embodiment of screen.
Figure 6D:
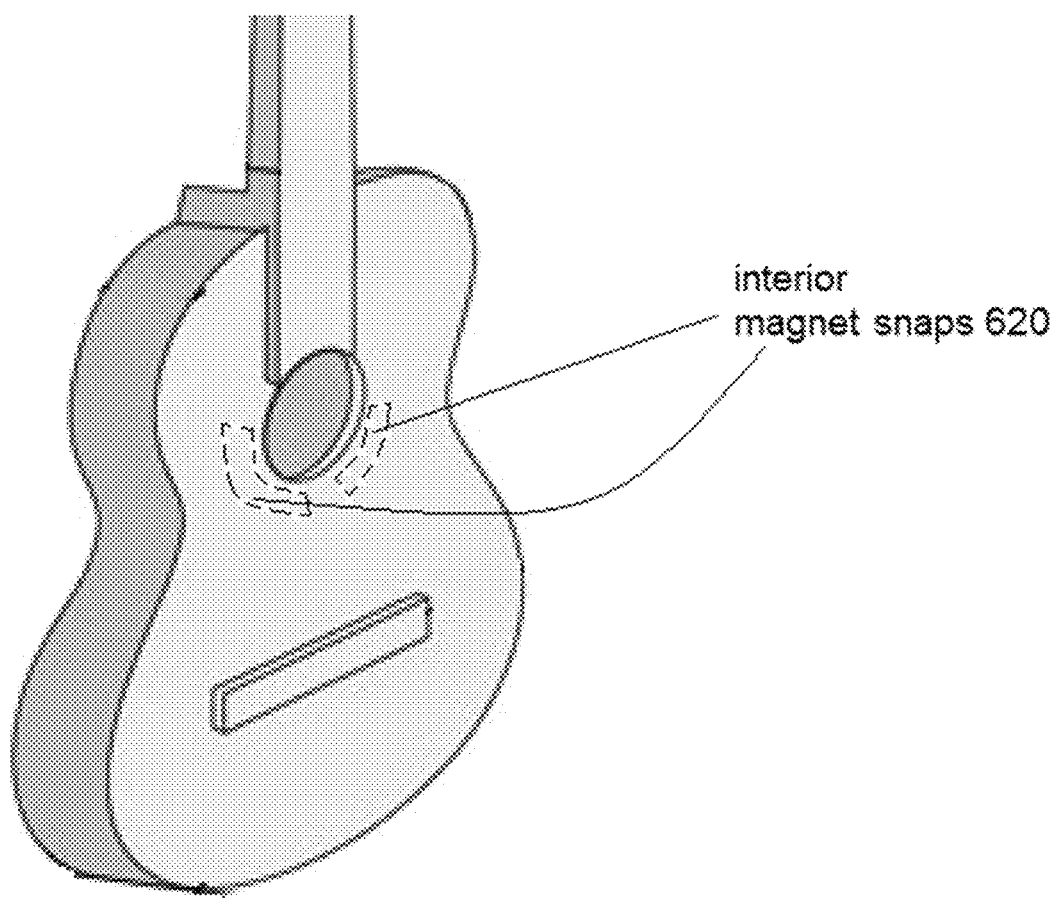
FIG. 6D shows magnet-snap embodiments.
Figure 6E:
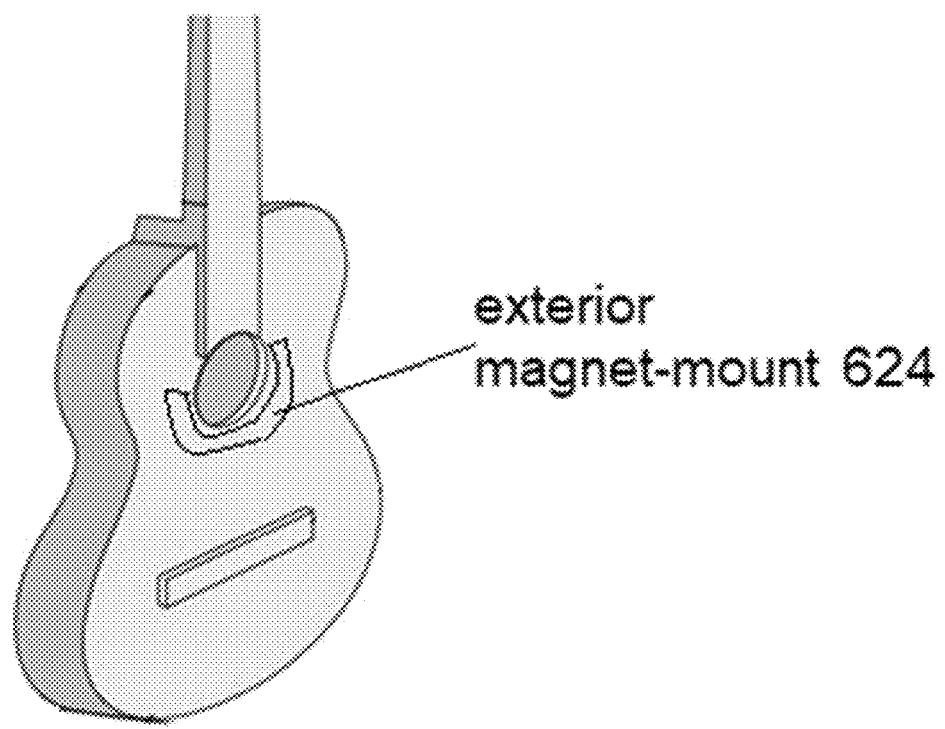
FIG. 6E shows a removable magnet mount.

FIG. 6C shows an embodiment in which a the device 100 is not composed of a frame 104 and a screen 108, but instead where a flexible screen 110 can be located within either the interior or the exterior of the guitar, using for example magnets as an attachment mechanism. Such an attachment mechanism would adhere directly to the instrument itself, using e.g. some type of adhesive. It is necessary that the screen 108 be flexible because it must be pushed through the soundhole of the instrument. Because by its nature, such a screen 108 would be larger than the soundhole, a rigid non-flexible screen could not work, as the screen 108 must be bendable enough to be squeezed to fit through the soundhole. FIG. 6C shows an example of a double mesh—double magnet embodiment of screen 110; FIG. 6D shows magnet-snaps 620 (in the shape of e.g. two semicircles); and FIG. 6E shows a removable magnet mount 624.

FIGS. 7A-7B shows a frame 104 having a slanted upper (string-facing) surface, intentionally not parallel with a lower (instrument-facing) surface. This feature is advantageous for a variety of purposes, one of which is locating pickup devices. From FIG. 7B it is apparent that the high point and low point of the frame are separated by a distance 'd'. The frame 104 of FIGS. 7A-7B can be rotated to accommodate, for example, a situation where it is desired to have bass or lower-frequency pickups closer to the strings than treble (higher frequency). Or, a situation where it is desired to have treble (higher frequency) pickups closer to the strings than bass (lower frequency) pickups. Another situation is to have the pickups slightly away from strings which are known to have problems with buzzing, using for example where alternative tunings exist, in which strings are intentionally too loose or too tight. There is sometimes no way to know this ahead of time. As such, the embodiment shown in FIGS. 7A-7B can be removed and re-seated, including while strings are installed and in-place.

Another situation would be where the pre-amps or pickups are having difficulty, not functioning properly, due to for example unexpected cross-talk or adjacent channel interference. Imposing some distance between the pre-amps or the pickups can sometimes reduce this, so having a frame 104 with an uneven upper surface can facilitate this.

The embodiment shown in FIGS. 7A-7B is illustrated to be suitable for a simple flush-mount screen 108, such as that shown in FIG. 8. However, the various other screens 108 and mounting mechanisms (see e.g. FIG. 8) could also be implemented.

FIG. 8 shows several details about an embodiment of the screen 108, including a variety of attachment mechanisms 804. The hole 804h in FIG. 8 assumes some type of matching with something on the frame 104, such as a protruding nub, magnet, or other corresponding attachment point on the frame 104. Similarly, the protruding nub 804n of FIG. 8 could match up with a hole or aperture within the frame 104. For brevity, various attachment mechanisms 804

Figure 9:
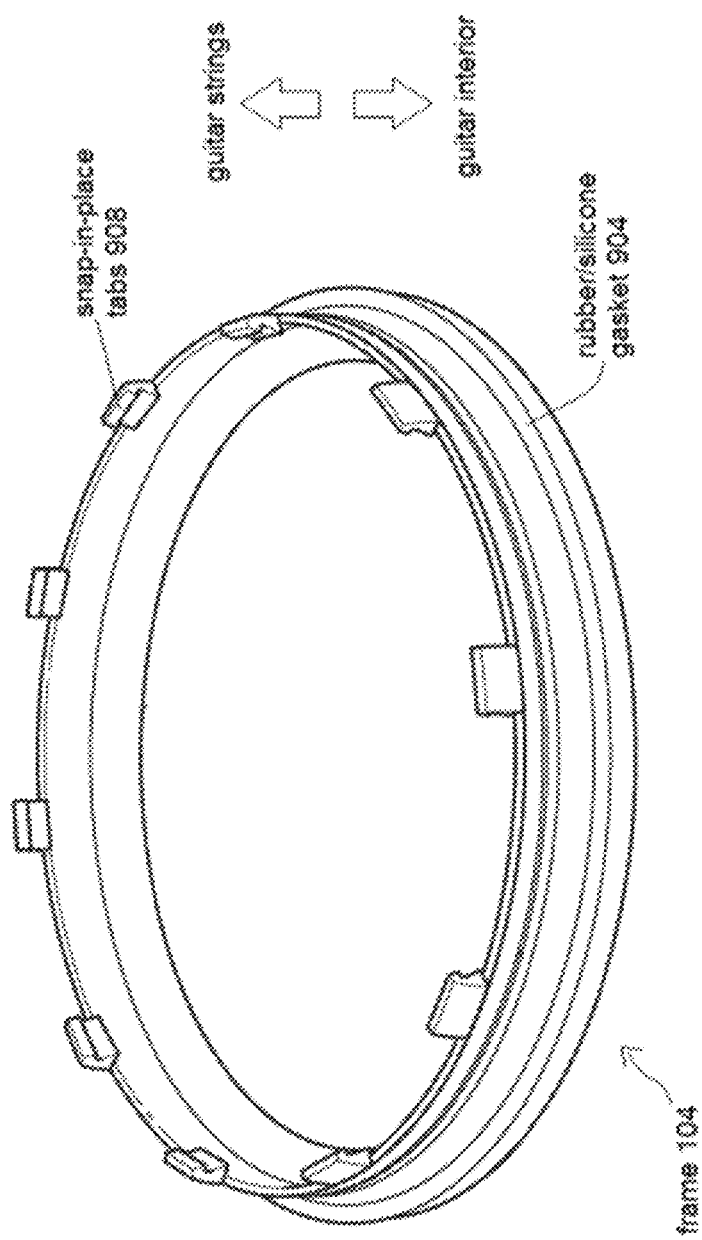
FIG. 9 shows an embodiment of the frame having snap-in-place tabs for securing a screen, and having a rubber/silicon gasket for being secured within a soundhole.

FIG. 9 shows an embodiment of the frame 104 having snap-in-place tabs 908 for securing a screen, and having a rubber/silicon gasket 904 for being secured within a soundhole of the musical instrument. One possible embodiment of a screen 104 that could fit with the frame 104 of FIG. 9 would be the planar screen 108 of FIG. 8, although other screens could also be used.

FIGS. 10A-10C shows another screen 108 having a multi-layer surface, and a bevel 1004 located therein. The screen 108 of FIGS. 10A-10C could be manufactured either by pressing two discs together, or forming a single thicker disk and then beveling a portion 1004 therefrom. FIG. 10C shows an embodiment which is different from earlier embodiments, in which the frame 104 is flexible and can be inserted within the guitar, attaching to an interior rather than exterior surface of the guitar itself. In such an embodiment, a suitable attachment mechanism may be an adhesive. One advantage of this embodiment is that the outer surface and appearance of the guitar is not affected.

Figure 11:
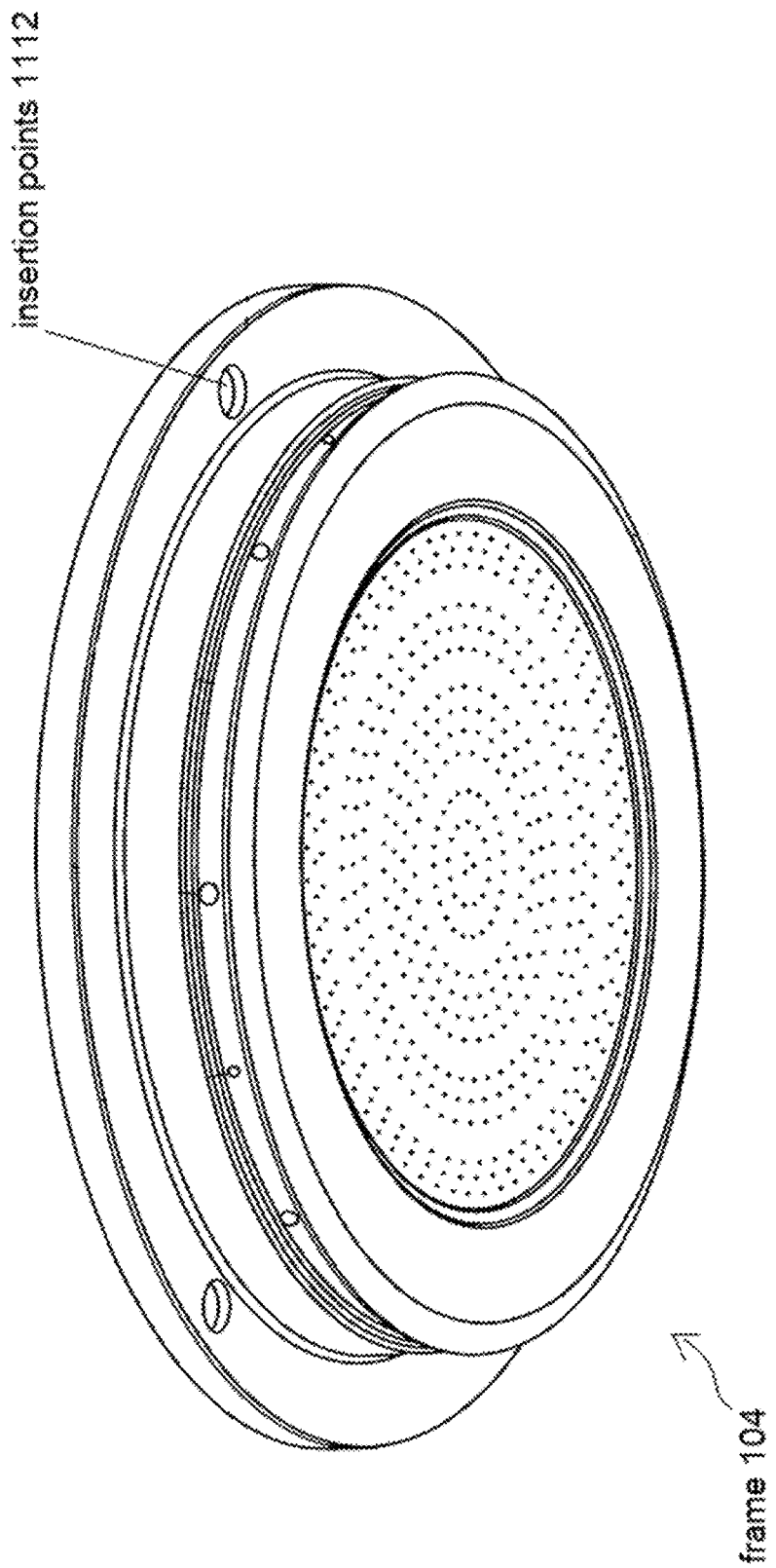
FIG. 11 shows a sound-cancelation embodiment of the frame.

FIG. 11 shows a sound-cancelation embodiment of the frame 104, which is not paired with a screen 108 like in most other embodiments disclosed herein. Instead, the frame 104 of FIG. 11 operates by itself, not only as a pickguard but as a way to facilitate practicing a guitar in environments where noise must be reduced (e.g. close quarters, dorm rooms, barracks, hotel rooms, or other living areas with minimal space where noise-sensitivity may be higher). In this embodiment, the interior of the frame 104 contains a foam sound-canceling substance 1104 (not visible from FIG. 11), and also has a rubber or silicone grommet 1108 which fits closely and snugly to the soundhole of the guitar. Further, the frame 104 is manufactured to have greater thickness that most of the embodiments disclosed herein, and protrudes further into the interior of the guitar, and also weighs more. This higher density helps promote sound absorption and has a deadening effect.

Figure 12A:
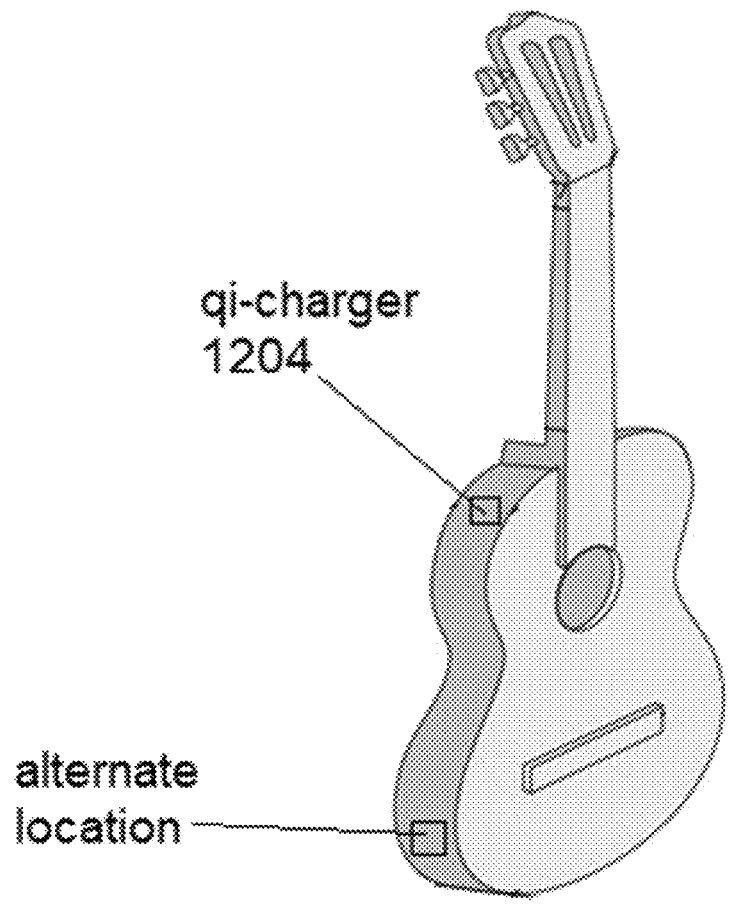
FIGS. 12A and 12B show examples of locations for various components of the embodiments.
Figure 12B:
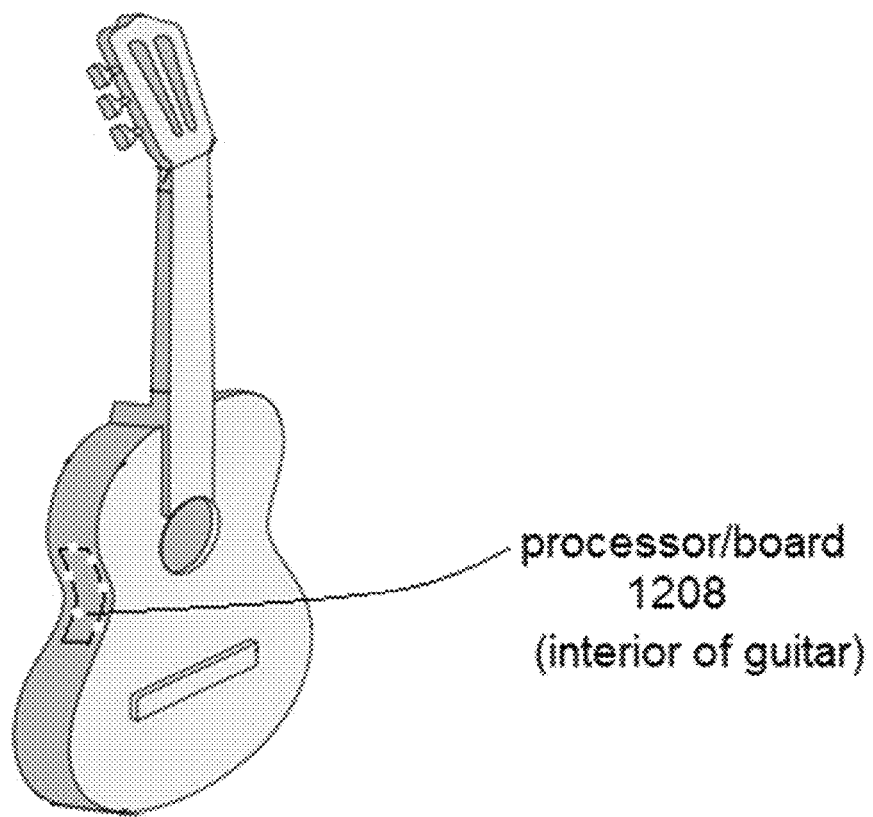

The embodiment of FIG. 11 can still be used in a performance context, but this would be where electronic amplification is available. Because the FIG. 11 frame 104 is heavier and denser, the sounds and vibrations generated by the guitar still exist, and although they cannot exit through the soundhole, they still have to go somewhere. One possibility is to be absorbed into the body panels of the guitar, either the planar front-back panels, or the curved side panels. Examples are shown in FIGS. 12A and 12B. In such an environment, an interesting combination of sounds can be obtained from pickups mounted on the side panels. While the sharpness and brightness of the tones generated this way may be diminished, the lower-end frequencies can still be captured and amplified. The result can be kind of a far-away tone, in which a listener's ear has more difficulty assessing the distance of the sound, due partly to the acoustic blockage created by this embodiment of the frame 104.

The frame 104 of FIG. 11, being larger and higher density, also has insertion points 1112 for various electronic components (e.g. BlueTooth® modules, pre-amplifiers, signal processors, camera devices, and potentially other mechanisms).

Begin Electrical Section

The device 100 can be manufactured with a power source embedded therein. In such an embodiment, the power source separated from main device/frame where wires extend to main device/frame, or the power source separated from main device/frame with wireless inductive power transfer to main device/frame.

The device 100 can be 3D printed, molded or manufactured, to have filament/mesh/fiber-optics within the frame 108 having multi-color components embedded therein, where the filament/mesh visually changes color according to frequency, where the filament/mesh/fiber-optics changes color according to volume\intensity, and/or where the filament/changes color according to rhythm. In these embodiments, the may be electrically conductive, in order to achieve the necessary visual transition. The may also have properties that make it responsive to external controlling, either through a mobile device 1234 or an on-site controller.

The frame 104 can have WiFi® or BlueTooth® corresponding with a nearby home/laptop computer or mobile device 1234, partly for data-gathering, but potentially for many purposes. For example, a parent supervising a child's practicing can be sure that the instrument is being touched. This embodiment is intended for a working parent who is concerned that they are spending money for instrument lessons, but the child is not holding up her end of the bargain. Using this embodiment, even while not present in the home, the parent can tell, right away, whether the child is practicing or not.

One possible solution would be to mount a digital Hobbes meter within the frame 104. These devices are often used for large equipment to determine how many hours a can tell that something was powered on. Within the embodiments herein, such an implementation could be used more to tell that the instrument was being played (not necessarily how well), but that someone is picking the strings. A digital Hobbes meter can be configured to turn off after a short period of time, typically less than a minute, like a pedometer. There are also ways to filter false-trigger events to prevent accidental activation. A Raspberry Pi or other integrated circuit board, could feed into an Arduino to trigger a tweet or a text to a concerned parent that wants to make sure the student is playing the instrument. These can be set up that it would be extremely hard to fool the electronics. If the student is practicing, it will be apparent, and apparent how long they practiced.

Next, as stated earlier, the device 100 can be permanently attached to the guitar through a variety of implementations. As stated, the frame 104 and screen 108 can be separate components that fit together, mechanical coupling only. Or, the fitting-together aspect of the frame-screen bond includes a 2-wire electrical connection; or 4-wire connection comprising data (2)+power (2). The device 100 can achieve charging of the power source inductively, e.g. through a Velcro® attachment that does not mark or deface the surface of the instrument.

The device 100 can also have rotating fidget-spinner effect. In this embodiment, the frame 104 has a fixed, immobile central axis. The attachment mechanisms between the frame 104 and screen 108 would be mechanically snug and immobile.

Next, the device 100 can assist with tuning, can act as tuning device either by itself (using colors) or in communication with separate mobile app 1304. The tuning can also be open tuning, drop-D tuning, sitar tuning, or some other tuning, all of which are selectable according to the nearby mobile app 1304.

The device 100 can have a drone-sticker attachment located elsewhere on the surface of the guitar (strictly decorative, visual-only), that in may vibrate in sympathy to the main device 100, including but not limited to possible holograms that move based on speed of an aggregate beat. Further, the lighting within the mesh 109 of the screen 108 can pulsate not on either of the above, but merely on speed of an aggregate beat. As stated earlier, the screen 108 is not limited solely to mesh surfaces.

Setting aside lights or electronics, the mesh 109 within the screen 108 can be fabricated or 3D-printed with static images, using special 3D filament that supports multi-coloring. In other words, the various desired patterns emerge straight from 3D printer (as opposed to where colors are added afterwards). Two such static images are shown in FIGS. 2A and 2B, but many other images are available.

The various power-consuming mechanisms of the device 100 can be located on the interior of the guitar, but still recharge using surface but non-mechanical contact with a qi charger 1204 positioned on an exterior of the guitar, as shown in FIG. within FIG. 12A. To be effective, the qi-charger must be plugged into a wall-outlet while charging the power-source of an electronic component.

Examples of electronic components that require charging but are desired to remain stationary within the guitar include but are not limited to an Arduino-type processor (or Raspberry Pi board) 1208. With the convenience of the external qi-charger 1204, such a processor/board 1208 can be mounted somewhere on the interior surface of the guitar, e.g. as shown in FIG. 12B.

Figure 12C:
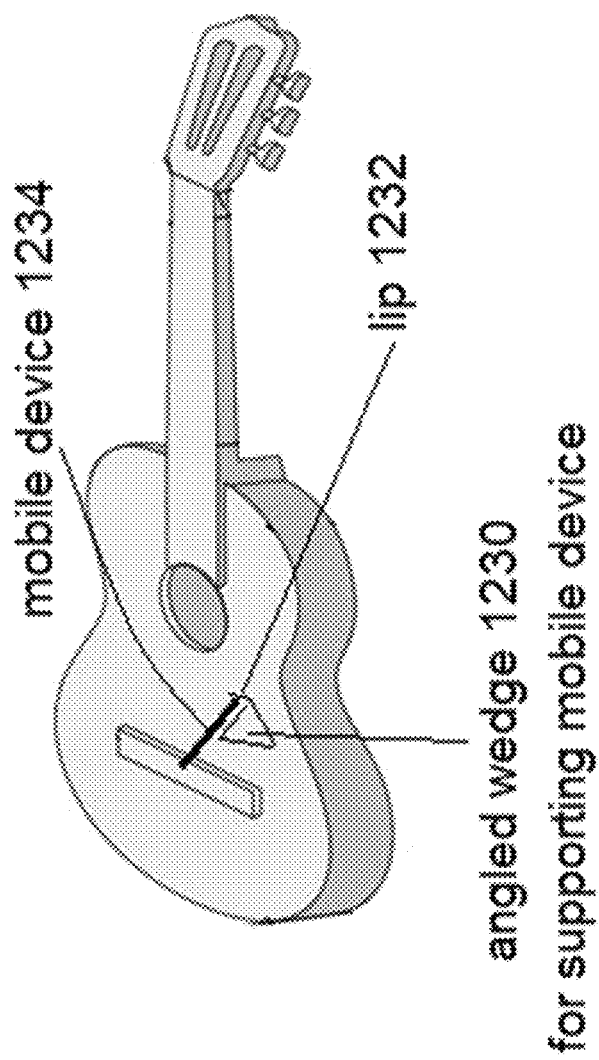
FIG. 12C shows a mechanism for attaching a mobile device.
Figure 13A:
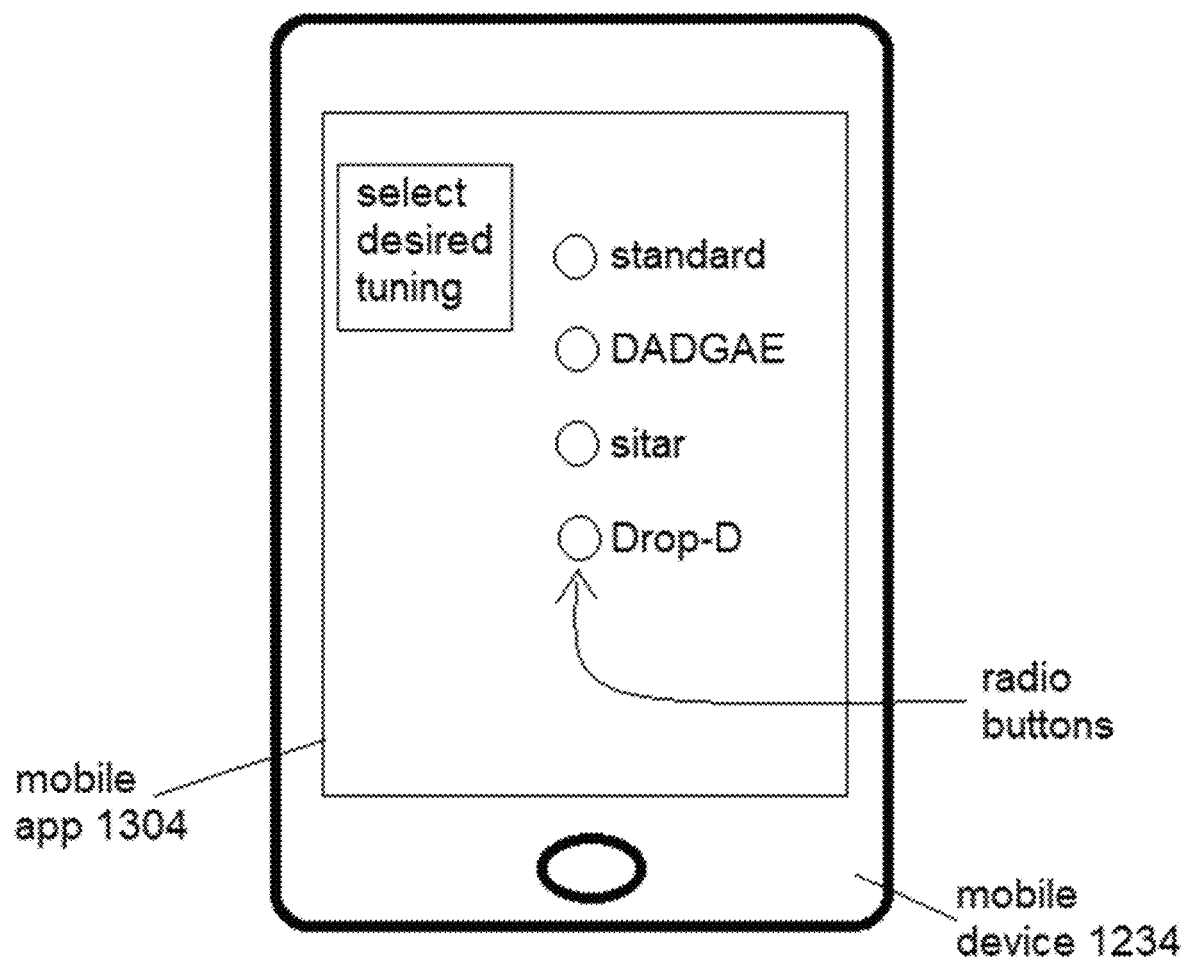
FIGS. 13A, 13B, 13C, and 13D show example mobile app GUIs.
Figure 13B:
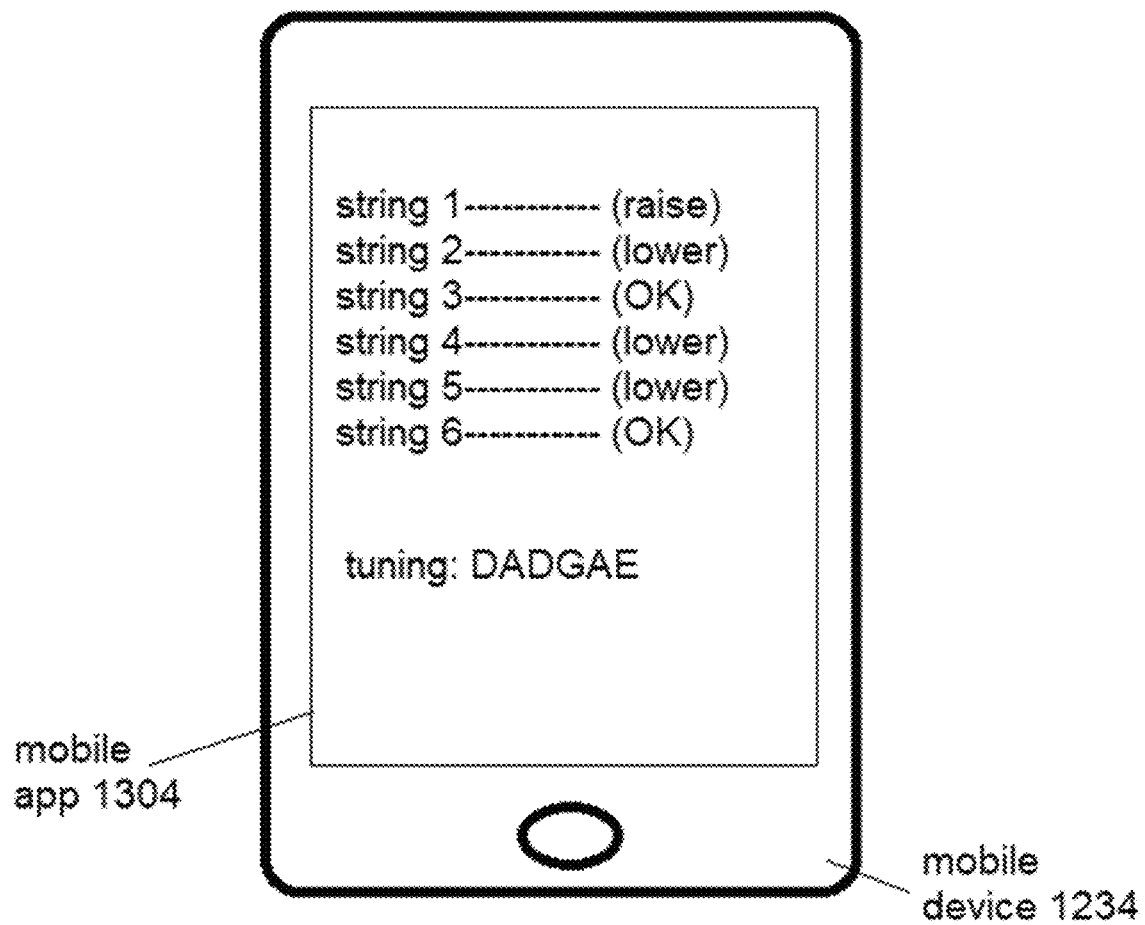
Figure 13C:
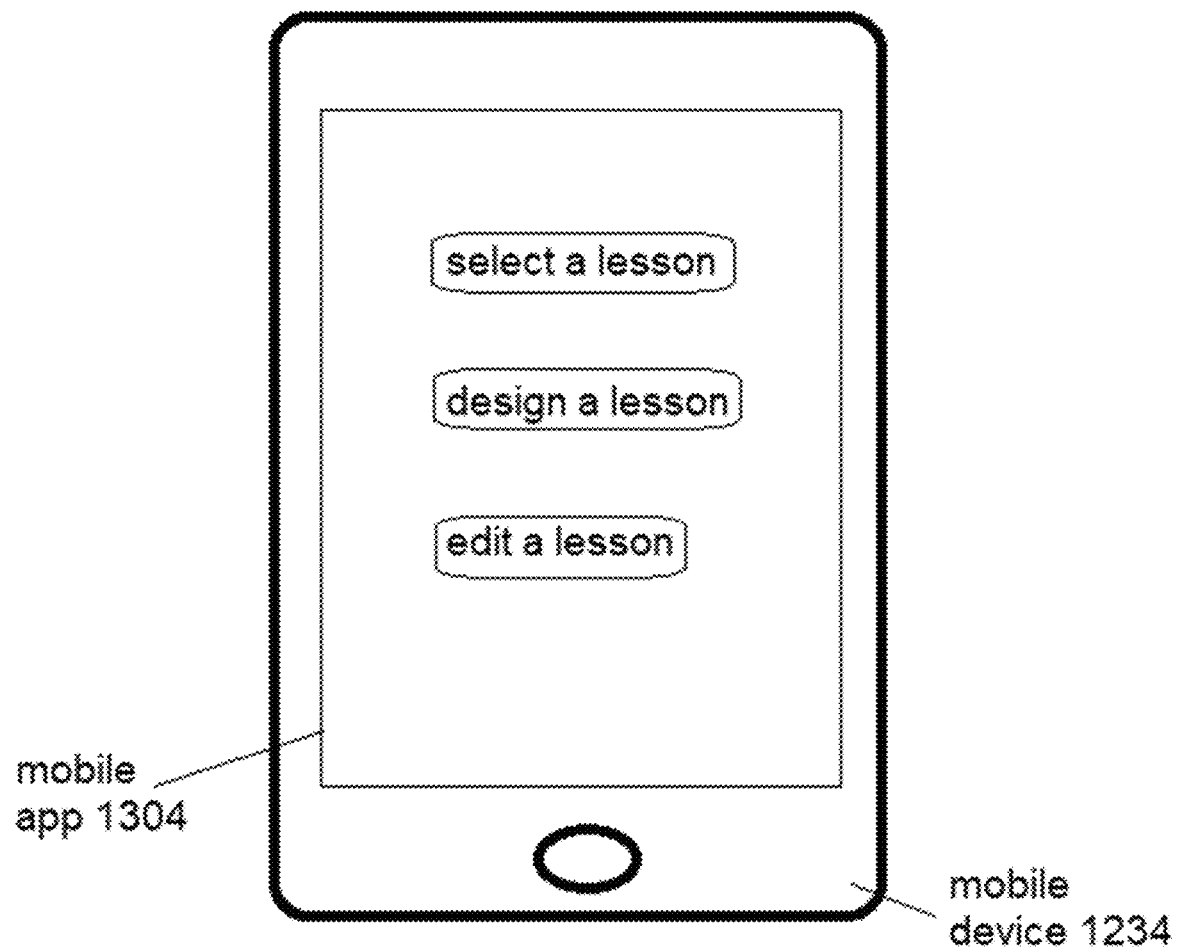
Figure 13D:
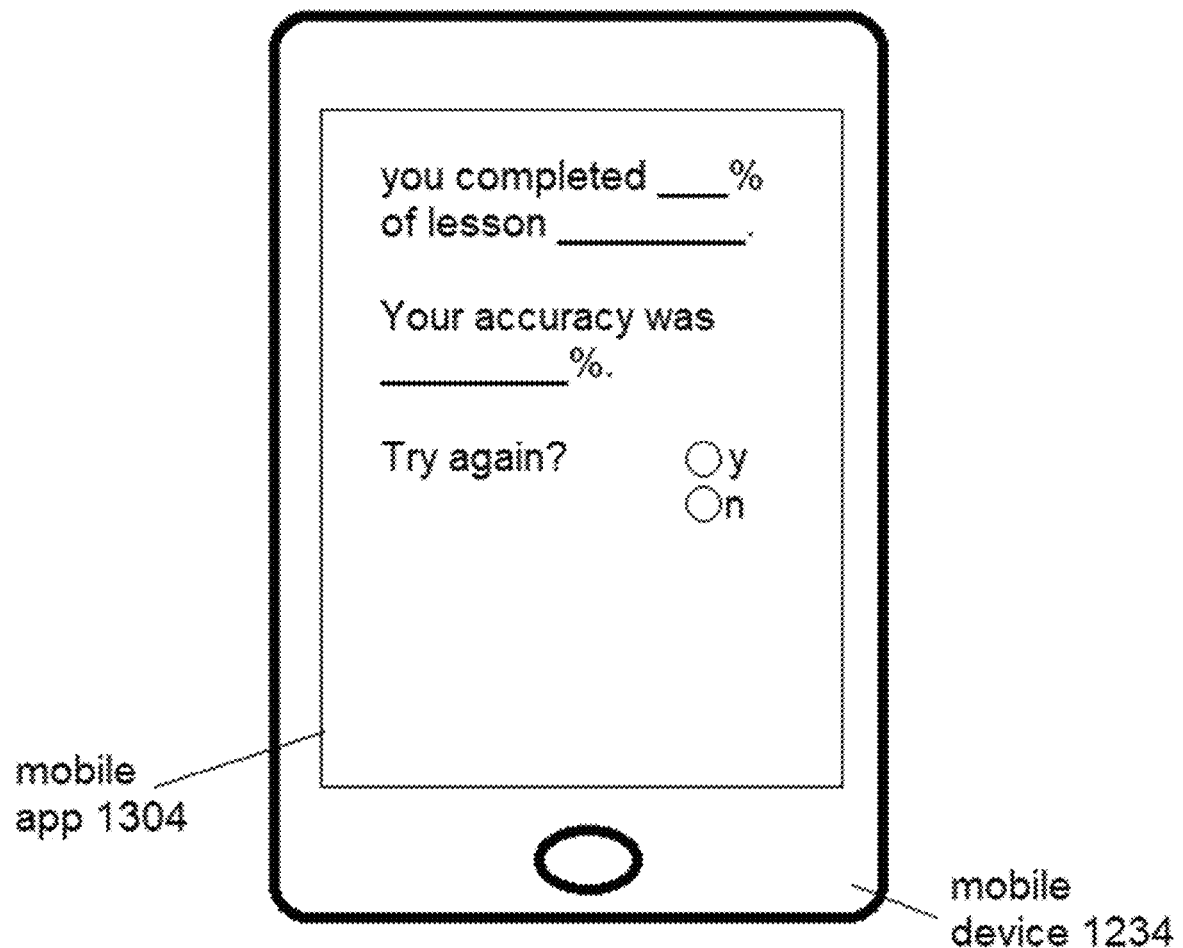

Additionally, because mobile devices 1234 such as Android® and iOS® hardware platforms are 1) powerful, 2) portable, 3) light, and 4) configurable, and 5) rechargeable, a variety of effects and digital signal processing can be loaded into an on-board Android® and iOS® which mounts directly on the surface of the guitar, as shown in FIG. 12C. This could be an older or discarded Android® and iPhone® hardware handset that does not have any data plan, no voice plan, but still has a functioning operating system and a functioning BlueTooth® capability. The wedge 1230 and lip 1232 remain permanently attached to the guitar, but the mobile device 1234 can either rest on the wedge 1230 and lip 1232, or can be fastened and secured. This depends on how permanently the user wants the mobile device 1234 to remain with the instrument. In an embodiment, the screen of the mobile device 1234 faces upward in such a way that it can be viewed while the person is playing the instrument. However, in other embodiments, this is not necessary, and the mobile device 1234 may lay flat against the guitar body. Further, depending on the function and utility the mobile device 1234 is being included for, the screen/display of the mobile device may be entirely disabled. An audience member or viewer of a person playing the instrument may only say a dull gray rectangle attached to the guitar, and have no idea what purpose it achieves.

The device 100 can also be coordinated with some type of "Guitar Hero" gaming effect, where device can detect pre-programmed fingering routines, and accumulate points, compete, or merely get better at completing a specific lesson or integrate via Bluetooth with popular lesson programs such as Yousician® or Ultimate Guitar® The device 100 can also works of conjunction with embedded pickup. This embodiment would coordinate with the mobile app 1304, and the musical routines would be stored in RAM within the mobile app 1304.

The device 100 can have a mini-camera embedded therein, e.g. GoPro, and\or an accelerometer embedded therein. The accelerometer could be used to, among other things, detect when guitar has been dropped or is being mishandled. The device 100 could communicate this via BlueTooth®, for example trigger to mobile-device to state "warning: guitar is being thrown, dropped, or is sliding in an unnatural way that could result in damage or loss". The device 100 could also do a similar warning using information from an embedded thermometer. Arduino, sending a predetermined warning text, according to conditions. These conditions could include, but are not limited to, theft-protection, hot car indicator, and string-breakage indicator.

In an embodiment, the frame 104 of the device 100 is manufactured with the ability to slightly expand\contract according to ambient temperature and humidity conditions, somewhat in sympathy to how guitar wood slightly expands\contracts.

Additionally, the screen 108 of the device 100 may not be planar, but instead can have 6 upraised surfaces mounted close to strings, for increased acoustic or semi-electronic pickup of sounds for transmission to some other product or amplifier, or in rare cases for dampening.

As stated earlier, there exist various embodiments having many different electronic components, some of which must be located off-board or away from the device 100, and thus located on different surfaces of the guitar. Accordingly, it may be helpful to space out the electronics, avoid feedback, move components around according to reaction and quality.

In a typical guitar, most of the vibration occurs on the top and bottom planar walls, sometimes called a soundboard, not the curved (non-planar) surfaces. Accordingly, as shown in FIGS. 12A and 12B, these curved non-planar surfaces can act as fertile real estate for locating various of the electronic components discussed herein. However, locating them improperly can result in negative consequences, such as cross-talk, adjacent channel interference, hum, hiss, distortion, and other problems. After extensive experimentation and adaptation, it was shown that locating the qi-charger 1204 as shown in FIG. 12A to be advantageous for reducing electronic cross-talk. Similarly, locating the processor/board 1208 as shown in FIG. 12B can be suitable for reducing adjacent channel interference. This is of course subject to considerable alteration and variance depending on which specific implementations of the embodiments discussed herein are currently in use, and even somewhat variable according to the type of song being played, type of rhythm, etc.

FIG. 13 shows some example GUIs of a mobile app 1304 that communicates either with the processor/board 1208.

Group Options

The WiFi® or Bluetooth® features discussed above can be set up to wide-cast to anyone in audience within a certain distance, so that rather than holding a lighter high with one hand, they can hold their mobile phones and show a group-pattern back to the stage, in some way in coordination with the notes being struck and/or vibrations coming out (increase sense of participation). However, such a feature requires they download the mobile app 1304, which must be specifically coordinated with the device 100 and a centralized server 1400. An example of this is shown in FIG. 14.

A key reason people go to concerts is to feel a sense of belonging, being part of a community, or simply escaping loneliness. Also to move around and potentially act on certain impulses that are normally restrained in polite society. The group options discussed herein give such users an opportunity to do so.

The screen 108 can be manufactured with a tight to act as type of mirror, when TV cameras are held close enough, the audience can see themselves reflected in the surface of the device. The device 100 can also be equipped with some type of YouTube® or Facebook Live® connection, where a videoed performance could include being embedded within the video some type of in-screen (e.g. lower RH corner of YouTube) data-displayer or active spectrum analyzer, showing frequencies and tones being generated, or information or messages embedded in the music.

The device 100 can also be manufactured like a 1970's "mood ring", where the device 100 somehow reflects the mood of a song, blue for cold, orange/red for hot based on e.g. ambient temperature. Further, in an embodiment, the device 100 can take an aggregate tempo and work from that, perhaps sense heat, sense nerve/anxiety level of a performer, heart rate, pulse, fit-bit hookup. Many audience members develop increased passion for music based on the performer's own energy levels.

In an embodiment, the frame 104 of the device 100 is manufactured with a GoPro® camera embedded therein. 1) shows on a JumboTron what the human's fingers look like from the guitar's point of view; 2) theft-protection, if moved unexpectedly, sends a text or takes a picture. However, when the guitar is removed from the case, the picture could help. Or a camera-ability could be attached to the case and activated from within the device 100.

In an embodiment, a digital display within the screen can incorporate a "color organ", that is, a device built with MOSFETS, that moves visually somewhat like VU meters. Such color organs can pulse (change wavelength) according to a combination of frequency\intensity of the sounds coming from the guitar. Specifically, the wavelength that is lit up corresponds with frequency of the sound being generated.

The color organ can vary intensity of light according to velocity of the strikings of the guitar pick (that has clearly not been lost inside the guitar). For separating the 6 strings, determining which may have been struck, a color organ can separate intensity from frequency. This is achieved by band-pass filters.

Moving back to the specialized still images that can be included within the or surface of the screen 108, there also exists a product called pallette (by Mosaic), which loads into software which drives a 3D printer. This product cuts and splices real-time to product photo-like realism on a surface printed by a 3D printer. Another embodiment features a 3D printing method of dyeing clear filament, where the colorations of the images get dripped at very small amounts during the 3D printing process. This techniques has less color-bleeding than other types of filaments.

Returning back to 3D printing possibilities, there exist 3D filaments that have electronic/conductive capabilities. These have very high resistance, lots of energy required to push through the 3D printer, and not always consistent in their electrical capabilities. Still, one purpose of this implementation would be that the electronic/conductive filaments could be used to power an on-site pre-amp that correspond with each of the 6 strings.

Further, rather than electronic/conductive filaments directly in the 3D printing, it may be easier to embed small wires in a non-3D context. Either way, having active conductors directly in the screen could make acquiring signals and sound information from the guitar to be easier and enable some interesting signal processing to be derived therefrom.

Earlier, various electronic components were discussed being located at various locations on the guitar-body itself. Some of these components require recharging of batteries and power sources. It is becoming more and more common for these to have magnetic connections rather than a physical charge jack e.g. USB or USB-micro. One example of this is a qi-charger.

In the Arduino or Raspberry Pi configurable boards 1208, it is also possible to use low-cost, 3.7v lithium batteries, in the event recharging is not practical or is not needed. While these have significant amperage draw, they are low-cost, ubiquitous and thus replaceable without difficulty.

Additional Features

Figure 17:
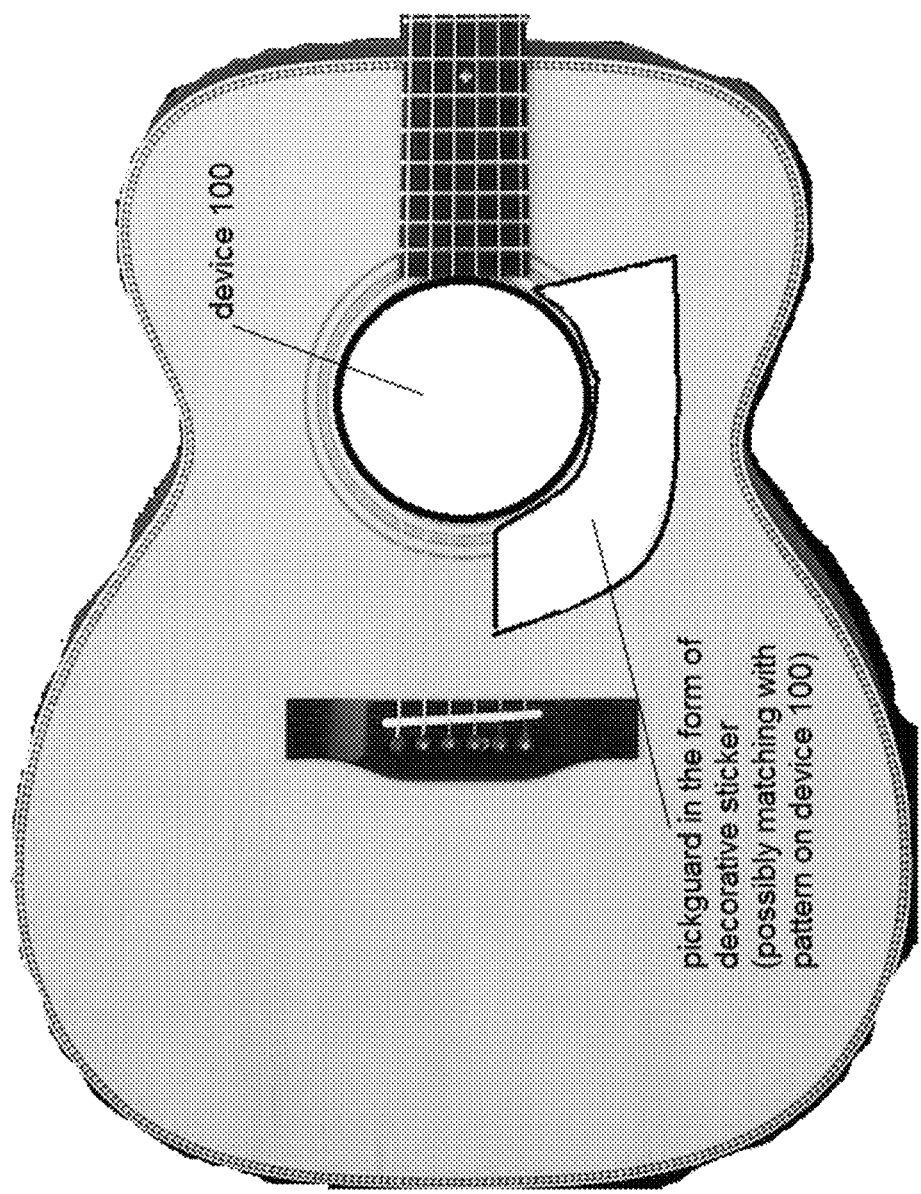
FIG. 17 shows a sticker-embodiment.

The device 100 is manufactured to be integrated with a pickguard, but this pickguard would be in the form of a sticker, a stick-on pickguard. Such a pickguard could have, for example, a Unicorn embedded on a pickguard leading into the device 100. FIG. 17 shows a non-limiting example of this.

Figure 18:
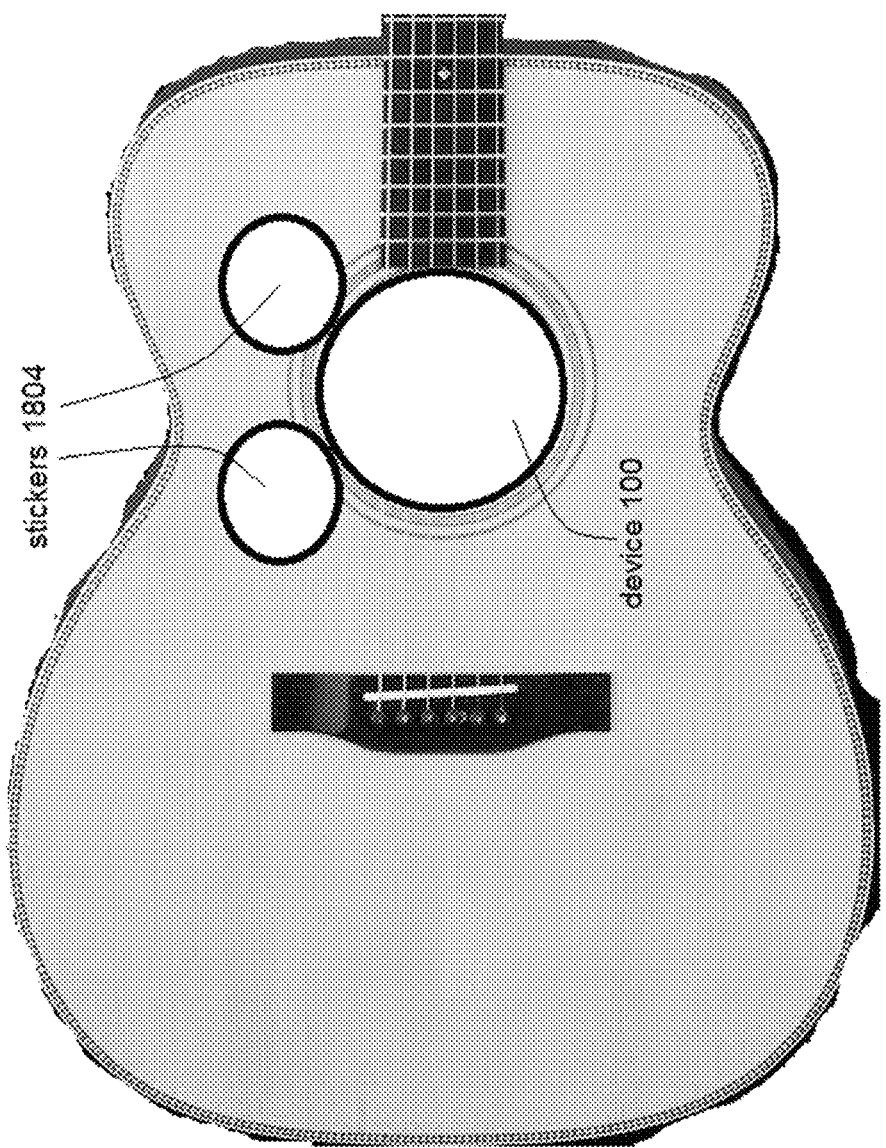
FIG. 18 shows a mickeyMouse-embodiment.

Further, as shown in FIG. 18, the device 100 can be manufactured with e.g. "Star Wars" themed sets, and/or Mickey Mouse themed sets, using e.g. stickers 1804.

The device 100 can be manufactured from wood, or leather patched rim of pickguard with soft mesh 109. Further embodiments include a device 100 with a lower magnet to suitable for connecting a mobile device 1234 for convenient attachment. One reason this might be valuable is in the case where the phone or mobile device 1234 is acting as an on-site stationary computer, but not necessarily in a phone-context. In light of the fact that modern mobile device 1234s contain an extraordinary amount of computing power, including potentially more computing power than what put a man on the moon in 1969, even the outmoded and antiquated mobile device 1234s can still provide processing capability for managing the electronics within the device 100, including the various communications therebetween using e.g. BlueTooth® capability.

The pickguard can be connected to device 100 in the form of peel-on stickers which are applied to the surface of an instrument. Further, a glue adhesive kit to permanently glue the device 100 to the instrument. A rotating plate that connects to the device 100 can spins when flicked.

The device 100 can be manufactured with a rotating plate having LED lights embedded within the (flick spin LED). The center axis would be sealed and manufactured in a 1-piece unibody construction that cannot be dis-assembled. Further embodiments include cloth patterned pick catcher collectables, and an e-commerce website to design one's own device 100 and ship directly, or through Amazon. In an embodiment, the e-commerce website can add additional fabric in middle of the screen 108 to print an uploaded picture thereupon from an online resource.

Figure 15:
FIG. 15 shows a pizza-embodiment.

As shown in FIG. 15, the device 100 can be in a clock shape, or in triangles (like pizza slices) as removable magnetic attachments. The backing of the plastic pizza-slice images can be made with a magnetic coating.

As shown at least within FIG. 6D, some embodiments of the device 100 can also be mounted inside the guitar, rather than externally as was shown in other FIGS.

In an embodiment, the device 100 can incorporate an electronic sound changer with microphone and embedded speaker in the soundhole of the guitar. Other embodiments can include an internal soundhole amplifier and speaker. Further, the device 100 can be attached to a pickguard in the form of a sticker (see FIG. 17).

The device 100 can also be equipped with a Bluetooth pickup, and can scroll with a foot pedal. The device 100 can be integrated with e.g. Onsong® or Ultimate Guitar®.

The device 100 can also be equipped with a low-gain pickup mechanism to transmit sounds to an earpiece, as a type of on-ear stage-monitor, for a musician at e.g. loud concert where that musician is uncertain about how much (or too much) of her sound is reaching the audience, or cannot hear what she is playing.

As discussed earlier, the device 100 can also be equipped with a sound recorder (with or without pickup) to record playing, or transmit the sound information to a mobile device 1234 through e.g. BlueTooth® where the various sounds can be digitally recorded and stored in a file. One way to achieve this would be using the mobile device 1234 as a passive computing device that is not connected to any data plan or telephone usage-plan, but still has a properly running operating system (either Android or iOS) and properly running BlueTooth® and WiFi.

One advantage of this configuration would be that such a recording would be pure and unadulterated, regardless of the venue, acoustics, or bandmates present. The user could get a clearer idea of their own accuracy, completely aside and segregated from whatever the other band members are doing.

As a practice aid and method of improving one's skill, it is important that musicians practice at a variety of tempos and pacings. To address this, the device 100 can have an integrated tuner, and/or an integrated metronome. This can include software and metering mechanisms for assessing an aggregate rhythm (and potentially sub-rhythms) and calculating e.g. beats/minute.

Next, material embodiments can include, but are not limited to, soft, hard metal (like a resonator used to enhance the sound of an acoustic guitar), partial cutaway, conical, a wood colored frame 104 and/or screen 108, multiple or custom sizes, and multiple basic sizes.

Additionally, the device 100 can have lights that light up inside of the guitar, laser lights, and\or a printed paper slot for printing a photo or paper and sliding that photo or paper into the screen 108.

The device 100 can be manufactured at least from ABS, PLC, metal, rubber, vinyl, plastic, leather, and/or resin. Next, the screen 108 can be manufactured from or incorporate from old records (vinyl) by cutting out the middle label section of a vinyl album and locating this cut-out where the mesh 109 would otherwise be located. Either the frame 104 or the screen 108 can have felt, wood, or other materials incorporated therein, either before or after 3D printing of various other features.

It is important that the device 100 be securely adhered to the guitar, and not shake loose or cause other problems. As such, potential adhesives for the frame 104 can include temporary peel 3M tape, permanent glue, magnetic attachments, reusable gummy glue, reusable adhesive (such as the adhesive used with Post-It® notes), and double magnet rings (e.g. one internal, one external). The embodiments shown herein are chosen partly for their attachability.

The device 100 can be manufactured into a variety of shapes, including but not limited to circular, circular but with notch cut out (e.g. D-shape, as shown in FIG. 3), oval, circular, square, rectangular, and other shapes.

The device 100 can be integrated with a pick-guard, is customizable, and can have an adjustable opening in which the tone emanating from the instrument is altered depending on where the adjustment occurs.

Some features described herein like flick-spin can be used on non-acoustic instruments also. In such a case, no pick-catching function may be needed, but many other of the features disclosed herein could still be of value. As such, the Title of this patent application should not be interpreted to be limiting.

Figure 16:
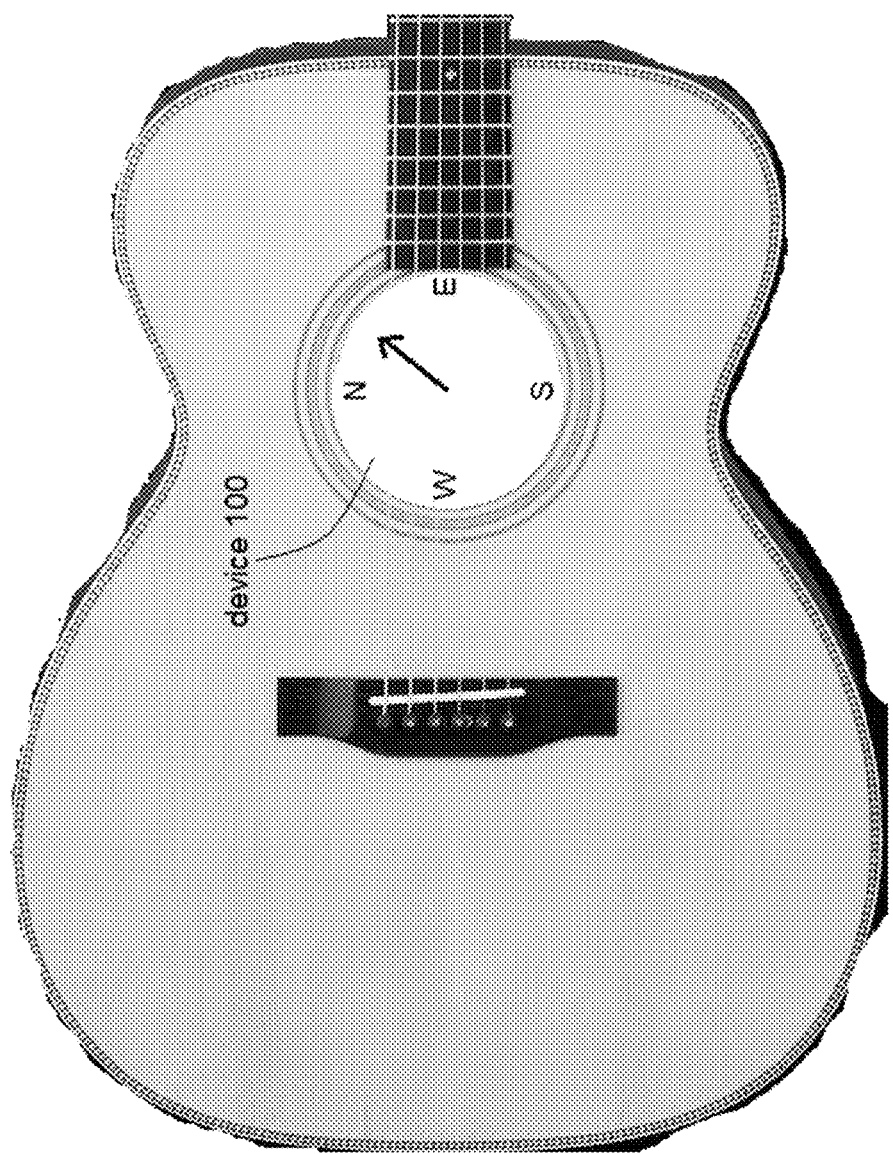
FIG. 16 shows a compass-embodiment.

Next, the device 100 could have a mute version for quiet play, could have sport shapes (e.g. FIGS. 2A and 2B), or the frame 104 could have an sport-shape but still accommodate a round screen 108, and could have compass point designs (the device 100 could be a compass, or could have a compass located below it, see e.g. FIG. 16). For example, a version of the device 100 suitable for quiet play is shown in FIG. 11. The compass embodiment may have psychological benefit for an audience, as the musician may have songs which express a "trying to find our way" theme, in which a compass would be a natural addition.

Further, with today's dependence on navigation equipment, movements for "back to earth, back to nature" or "reducing screen time" could find this feature to increase engagement and understanding.

Disclaimers\Non-Limitations

Any methods disclosed herein comprise one or more steps or actions for performing the described method. The method steps and/or actions can be interchanged with one another. In other words, unless a specific order of steps or actions is required for proper operation of the embodiment, the order and/or use of specific steps and/or actions can be modified.

In the above description of embodiments, various features are sometimes grouped together in a single embodiment, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

While specific embodiments and applications of the present invention have been illustrated and described, it is to be understood that the invention is not limited to the precise configuration and components disclosed herein. Various modifications, changes, and variations which will be apparent to those skilled in the art are made in the arrangement, operation, and details of the methods and systems of the present invention disclosed herein without departing from the spirit and scope of the invention.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of manufacturing a pickcatcher device, comprising:
    manufacturing a circular tilted frame having an inner and outer diameter;
    manufacturing a circular screen, also having an inner and outer diameter, to be inserted within the circular tilted frame in a non-movable snug-fit;
    fabricating the circular tilted frame to have a circular string-facing surface and a circular instrument-facing surface, wherein an entirety of the circular string-facing surface is formed to be opposite to an entirety of the circular instrument-facing surface;
    fabricating the entirety of the string-facing surface to be substantially flat and thus occupying a first plane;
    fabricating the entirety of the instrument-facing surface to be substantially flat and thus occupying a second plane;
    fabricating the circular tilted frame so that the first and second planes are tilted relative to each other and not parallel;
    preparing the instrument-facing surface of the circular tilted frame to be suitable for attachment to a surface of an instrument;
    fabricating the circular tilted frame in a size suitable for insertion within and covering a top of a soundhole within the instrument; and
    fabricating the circular screen to be suitable to fit within the instrument-facing surface of the circular tilted frame.

2. The method of claim 1, further comprising:
    locating a bevel within the circular tilted frame.

3. The method of claim 1, further comprising:
    fabricating the string-facing surface and the instrument-facing surface of the circular tilted frame so that the circular screen is attached to a insertion channel located within the circular tilted frame between the string-facing surface and the instrument-facing surface, and thus the circular screen is not bodily flush with either of the string-facing surface and the instrument-facing surface of the circular tilted frame.

4. The method of claim 1, further comprising:
    the circular screen being attached to an insertion channel located within the circular tilted frame at edge portion of the circular screen,
    whereby a portion of the circular screen that includes a desired design does not contact the circular tilted frame.

* * * * *